(12) United States Patent
Lapeyre et al.

(10) Patent No.: US 6,269,939 B1
(45) Date of Patent: Aug. 7, 2001

(54) CONVERTING ROLLER CONVEYORS INTO BELT CONVEYORS

(75) Inventors: Robert S. Lapeyre, New Orleans; Christopher G. Greve, Covington, both of LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/434,796

(22) Filed: Nov. 5, 1999

(51) Int. Cl.[7] .......................... B65G 35/00; B65G 15/60; B65G 17/00
(52) U.S. Cl. ............................................ 198/615; 198/841
(58) Field of Search .................... 198/615, 617, 198/841

(56) References Cited

U.S. PATENT DOCUMENTS

| | | | | |
|---|---|---|---|---|
| 3,200,940 | * | 8/1965 | Higgins | 198/841 X |
| 3,621,986 | * | 11/1971 | Webb | 198/841 X |
| 5,261,527 | * | 11/1993 | Krismanth et al. | 198/841 X |
| 5,350,053 | * | 9/1994 | Archer | 198/841 X |
| 5,415,274 | * | 5/1995 | Krismanth et al. | 198/841 X |
| 5,641,071 | * | 6/1997 | Read et al. | 209/319 X |
| 5,799,780 | * | 9/1998 | Steeb, Jr. et al. | 198/841 X |
| 6,095,320 | * | 8/2000 | DeMong et al. | 198/841 X |

* cited by examiner

Primary Examiner—Christopher P. Ellis
Assistant Examiner—Gene O. Crawford
(74) Attorney, Agent, or Firm—James T. Cronvich

(57) ABSTRACT

A conversion kit and a method for inexpensively converting a roller conveyor into a belt conveyor. The converted conveyor is made from a roller conveyor that has a frame with two parallel sides supporting a set of parallel rollers at spaced apart locations. A conversion kit is used to make the conversion. The kit includes attachment collars that fit around selected rollers and wearstrip material that extends outward from the attachment collars and overlies a group of consecutive collars. The wearstrip material and the collars resting on the rollers form a carryway bed on which a conveyor belt or chain is supported.

44 Claims, 10 Drawing Sheets

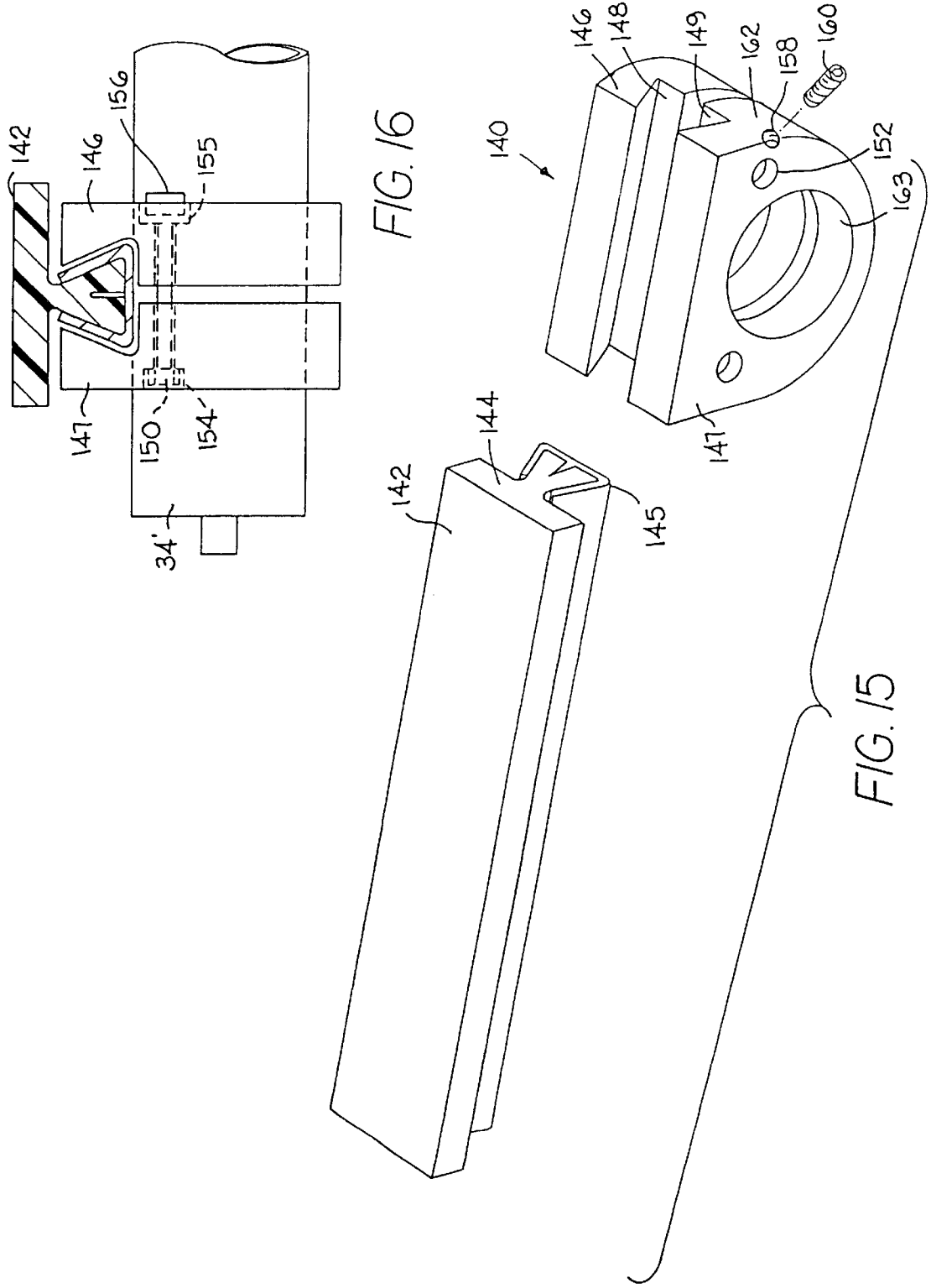

CONVERTING ROLLER CONVEYORS INTO BELT CONVEYORS

BACKGROUND OF THE INVENTION

1. Field of the Invention

The invention relates to belt or chain conveyors and, more specifically, to means and methods for converting roller conveyors into belt or chain conveyors.

2. Description of Related Art

Roller conveyors are commonly used, especially in the package handling industry, to provide a solid conveying surface for a variety of materials. Typical roller conveyors include a steel, galvanized, or aluminum frame with parallel side walls. An array of cylindrical rollers is supported between the side walls. Spring-loaded shafts extending from the ends of the rollers rest in openings in the side walls spaced to provide standard roller centers, such as 1.5 inches or 2 inches and their multiples. The topmost portions of the rollers lie in a conveying plane. Packages or other products placed on the conveying plane span two or more rollers. In the simplest of roller conveyors, packages are transported by gravity when the conveying plane is inclined or by a push when the conveying plane is horizontal. The momentum of the packages contacting a roller causes the roller to rotate and transport the package to the adjacent downstream roller. In powered roller conveyors, a rubber or fabric belt frictionally drives one or more of the conveying rollers to transport packages. Because of their simple construction, roller conveyors are an inexpensive means for conveying packages.

But roller conveyors have shortcomings. First, the roller bearings wear over time, which causes a roller to roll less easily or to freeze completely. Second, the mounting holes for the roller can wallow out, which can cause the rollers to assume cocked orientations relative to each other and to the conveying plane. Third, as they age, roller conveyors can become noisy. Fourth, because passive horizontal roller conveyors depend on a push to get a package rolling, there is no guarantee that the package will make it to its destination without getting stranded.

To meet changing conveyance demands, motor-driven belt or chain conveyors often replace roller conveyors. Motor-driven belt conveyors are less noisy, avoid stranding packages, and are especially helpful in transporting high volumes of packages. Because the roller conveyor is already in place, using as much of it as possible to support the replacement belt conveyor is advantageous. In many cases, a belt is merely installed on the roller conveyor frame with the rollers acting as a carryway support for the belt. One problem with this solution is the noise generated by the belt bouncing up and down on the undulating and intermittent support surface provided by the rollers. For that reason, the rollers are often removed and replaced by a metal support structure positioned between and supported by the side walls of the roller conveyor frame. But it takes a lot of time and effort to remove the rollers and construct, fit, and install the support structure.

Clearly there is a need for a simple and quick way to convert a roller conveyor into a motor-driven belt or chain conveyor.

SUMMARY OF THE INVENTION

This need and others are satisfied by a conveyor conversion kit and associated conversion method having features of the invention. The conversion kit includes an attachment collar and an associated wearstrip. The attachment collar surrounds all or part of the circumference of a first roller of the original roller conveyor. The wearstrip extends outward from the attachment collar to overlie a group of consecutive rollers. The wearstrip is supported by the rollers. In an actual conversion, many attachment collars and associated wearstrips are mounted on the rollers to form a generally planar carryway bed to support a motor-driven conveyor belt in the former roller conveyor frame. In this way, a belt conveyor according to the invention is constructed.

In some versions of the conversion kit, the attachment collar surrounds only part of the circumference of the roller so that the collar may be slipped on or clipped on as a spring clip. In other versions, the attachment collar completely surrounds the roller. For example, the collar has a central bore contoured to match the circumference of the rollers and is installed by sliding over an end of the roller along its length. In other versions, the collar comprises two sections surrounding complementary portions of the roller circumference. The two sections may be separable at, for example, a hinge. A latch may be used in other versions to lock the collar in place on the roller. In another version, the attachment collar includes an attachment portion about the roller with a threaded hole through the attachment portion to admit a set screw that, when tightened, bears against the roller and prevents it from moving relative to the collar. In other versions, the collar includes a locking band, such as a hose clamp or a cable tie, or a lockable cuff or a spring clip to attach to the roller. For use especially with off-the-shelf metal-framed wearstrip, the collar is made of two halves with confronting notches that form a width-adjustable channel that squeezes against the metal-encased wearstrip to hold it fast when a fastener connecting the two halves is tightened.

The wearstrip in some versions is a rectangular length of material extending transverse to the roller axes in the direction of belt travel. Each wearstrip length is attached to, or integrally extends from, an attachment collar. In other versions, the wearstrip is in a zig-zag pattern with attachment collars at one or more of the vertices of the zig-zag pattern. In yet other versions, the wearstrip is a flat plate covering most of the width of the conveyor between the side walls. The flat plate is attached at various locations to attachment collars, such as one having a stem disposed between adjacent rollers and with first and second arms extending in opposite directions from the lower end of the stem to surround portions of the adjacent rollers. The top end of the stem attaches to the wearstrip, which is held down by the bifurcated attachment collar.

A method for converting a roller conveyor into a belt conveyor includes attaching collars to selected rollers of the roller conveyor, arranging wearstrip material that extends from or attaches to the collars in a pattern overlying and spanning consecutive rollers to form a conveyor bed of wearstrip material supported on the rollers, and installing a conveyor belt chain on the conveyor bed.

Thus, it is possible to take advantage of a roller conveyor already in place by attaching the elements of a conveyor conversion kit to a roller conveyor to convert it quickly into a less noisy belt conveyor without having to remove the rollers.

BRIEF DESCRIPTION OF THE DRAWINGS

These and other features, aspects, and advantages of the invention are better understood by referring to the following description, appended claims, and accompanying drawings, in which:

FIG. 15 is an exploded perspective view of yet another version of components of a conversion kit useful with the conveyor of FIG. 1 having two clamping halves, set screws, and adjustable fasteners;

FIG. 16 is an end elevation view of the conversion kit of FIG. 15;

DESCRIPTION OF THE EMBODIMENTS

Figure 1:
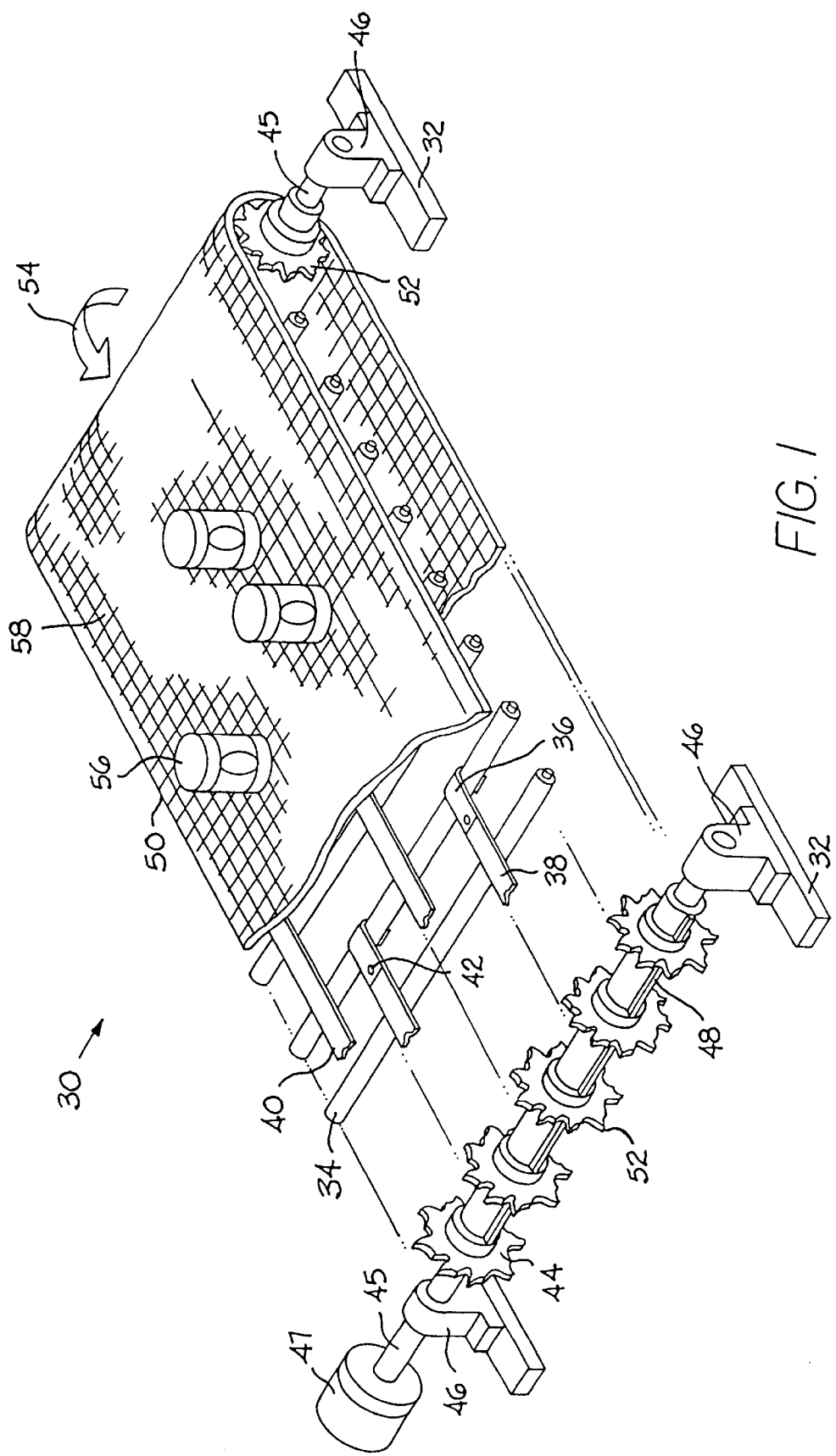
FIG. 1 is a partial perspective view of a belt conveyor converted from a roller conveyor and embodying features of the invention.

An exemplary version of a roller conveyor converted into a belt conveyor embodying features of the invention is shown in FIG. 1. The converted conveyor 30 is mounted on a frame 32 (but largely omitted from FIG. 1 for clarity) supporting a plurality of cylindrical rollers 34 mounted parallel to one other across the width of the conveyor. Attachment collars 36, attach to the rollers at selected locations. Wearstrips 38, in the form of strips with a rectangular cross-section, extend out from the attachment rollers to overlie a group of consecutively arranged rollers. The wearstrip rests directly on the rollers for support and forms with the other wearstrips and attachment collars a substantially planar carryway bed 40 of staggered wearstrips. The wearstrips, which could be integrally formed with the attachment collars out of one material, are shown in FIG. 1 as different pieces connected together by a bolt or screw 42, for example. The wearstrip could be made of a variety of materials, such as stainless steel or plastics. UHMW (ultra-high molecular weight) plastic is often used as a wearstrip material.

Once the rollers are outfitted with the attachment collars and wearstrips, a belt drive is mounted to the frame at the end of the carryway. The drive includes a plurality of sprockets 44 positioned at spaced apart locations along a drive shaft 45. Bearing blocks 46 support the shaft, which is driven by a motor 47. A raised key 48 transmits rotational power from the cylindrical shaft to the sprockets. Shafts with square or other polygonal cross sections not requiring keys could be used as well with sprockets having correspondingly shaped bores. A similar shaft and sprocket arrangement at the other end of the carryway need not include a motor and may serve as an idler sprocket set. A conveyor belt 50 is shown strung between both sets of sprockets. Teeth 52 on the periphery of each sprocket engage structure in the inner side of the belt and drive the belt in the direction of arrow 54, for example. Products 56 are transported on the article-conveying surface 58 of the belt along the carryway. Because of the motor, the belt can run continuously or be stopped and started. As long as the belt is running, no articles will be stranded on the converted belt conveyor as they could be on a passive roller conveyor. The belt can be a metal belt or chain or a modular plastic conveyor belt in either a bricklaid or a non-bricklaid pattern. A rubber or fabric belt for which drum rollers replace the sprockets can alternatively be used in the converted conveyor.

Figure 2:
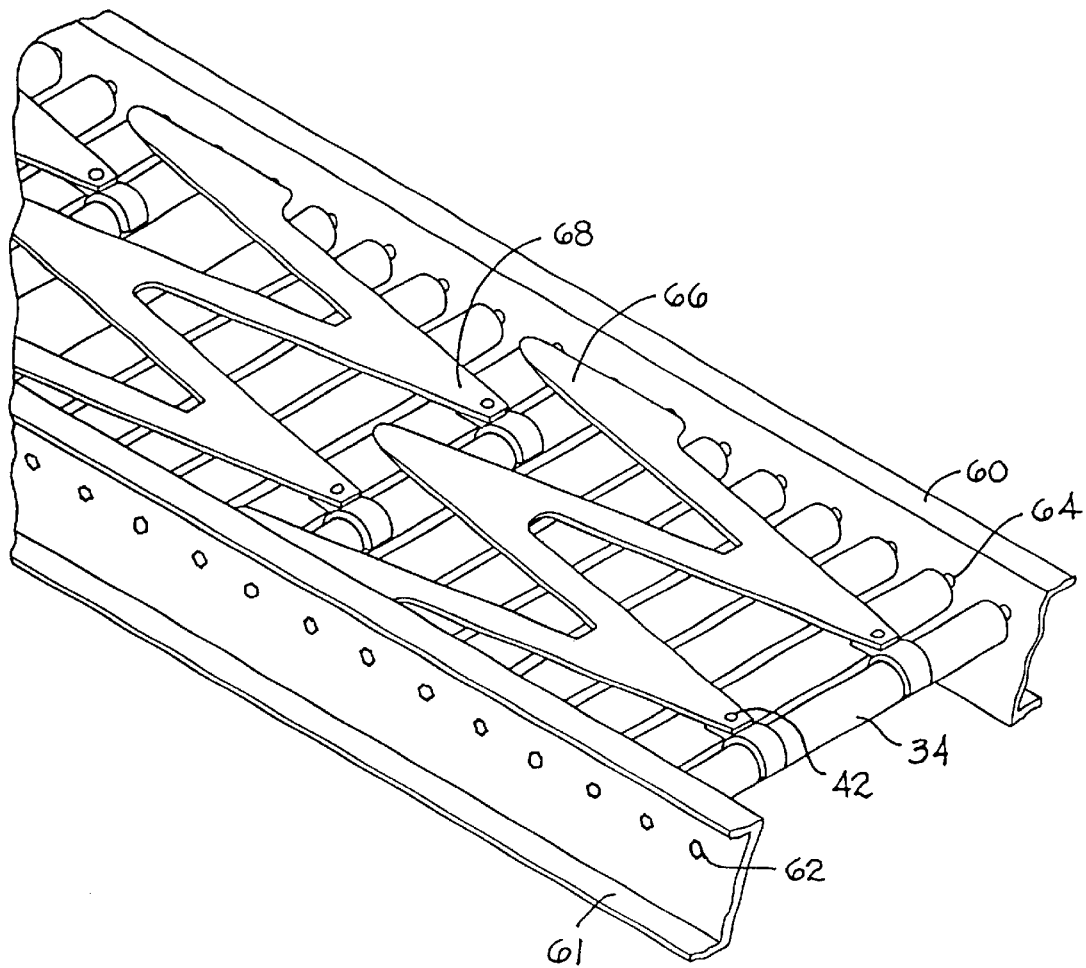
FIG. 2 is a partial perspective view of another version of a roller conveyor converted into a carryway bed for a belt conveyor embodying features of the invention.
Figure 3:
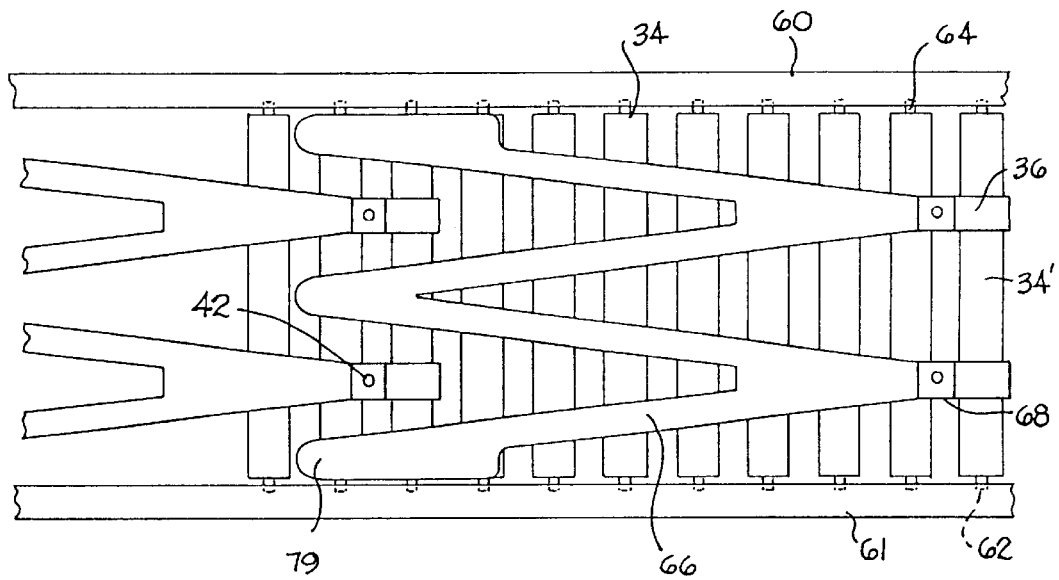
FIG. 3 is a partial top plan view of a belt conveyor as in FIG. 2.

More details of the conversion are shown in FIGS. 2 and 3. The conveyor frame includes, along the carryway, a pair of parallel side walls 60, 61 formed of pieces of metal channel. Holes 62, typically hexagonal in shape, are formed in the side walls on spacings, such as 1.5 inches or 2 inches. The rollers 34 have spring-loaded shaft stubs 64 extending from each end. The stubs fit in the holes in the side walls. Bearings inside the rollers allow the rollers to rotate about the stubs. In this way, the rollers are supported in parallel between the side walls and are free to rotate. Instead of the linear wearstrip aligned in the direction of belt travel as in FIG. 1, the conveyor of FIGS. 2 and 3 has a plurality of wearstrips 66 in a zig-zag pattern forming a conveyor bed on which a belt can be installed. The zig-zag wearstrip extends from attachment collars at vertices 68 of the wearstrip. As in FIG. 1, the wearstrip can be attached by bolts or screws to the collars or can be integrally formed with them. The collars attach to the rollers to hold the wearstrip in place supported on a group of consecutive rollers. The attachment collars could alternatively or additionally be attached at the other vertices or end points 79 of the zig-zag wearstrip.

Figure 4:
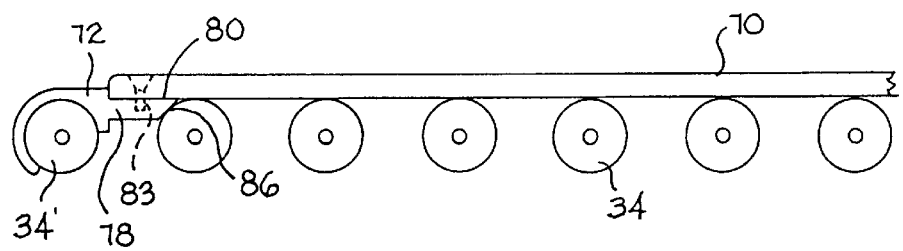
FIG. 4 is a partial side elevation view of another version of a conveyor conversion kit useful in a conveyor as in FIG. 1.
Figure 5:
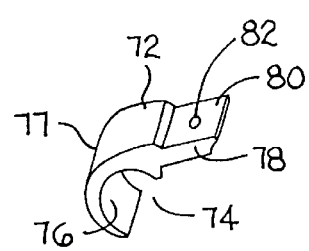
FIG. 5 is a perspective view of an attachment collar as in FIG. 4.

Various versions of kits that include components useful in converting roller conveyors into belt conveyors are shown in FIGS. 4–20. In FIG. 4, rollers 34 are shown spanned by a section of wearstrip material 70 extending from a collar attachment 72 that partly surrounds the circumference of a first roller 34'. Further details of the collar are shown in FIG. 5. The collar is C-shaped with a throat 74 between the ends of the C. The throat is preferably narrower than the diameter of the outer surface of the roller. The collar can be attached to the first roller by pushing the collar onto the roller from a direction perpendicular to the axis of the roller. As the collar is pushed in, its throat expands until the ends of the C pass diametrically opposite points on the outer surface of the roller. Then the throat relaxes completely or partially as the collar snaps in place around the roller. The inner surface 76 of the roller attachment portion 77 of the collar is contoured to match the outer surface of the roller when the collar is attached. A wearstrip attachment portion 78 of the collar is recessed to form a shelf 80 on which the wearstrip sits. A hole 82—a through hole or a dead-end threaded hole— formed in the shelf aligns with a through hole 83 in the wearstrip to admit a bolt or screw, such as a flat-head screw, to fasten the wearstrip securely to the collar. One end of the wearstrip attachment portion includes on its bottom side a roller contact surface 86 contoured to rest on an adjacent roller for support. As a conveyor belt moves along the wearstrip toward the right on FIG. 4, forces in the direction of belt travel tend to cause the collar to rotate clockwise and bow the wearstrip between consecutive rollers. By spanning the gap between consecutive rollers and providing a roller contact surface supported at its distal end by a roller, the wearstrip attachment portion bolsters the wearstrip and inhibits it from bowing between rollers.

Figure 6:
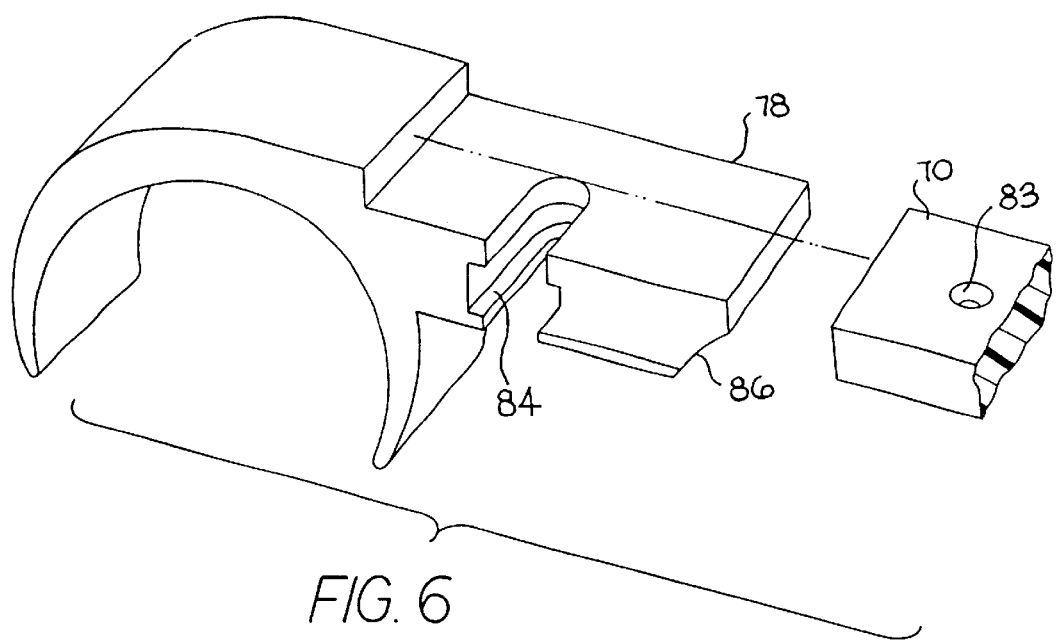
FIG. 6 is a partial exploded perspective view of another version of an attachment collar and wearstrip useful in a conveyor as in FIG. 1.

Another version of collar with slightly different wearstrip attachment features is shown in FIG. 6. In this version the wearstrip attachment portion 78 includes a rectangular slot 84 for a nut (not shown) engaged by a screw (not shown) through the hole 83 in the wearstrip 70. As in FIGS. 4 and 5, the collar also includes contoured roller contact surfaces 86.

Figure 7:
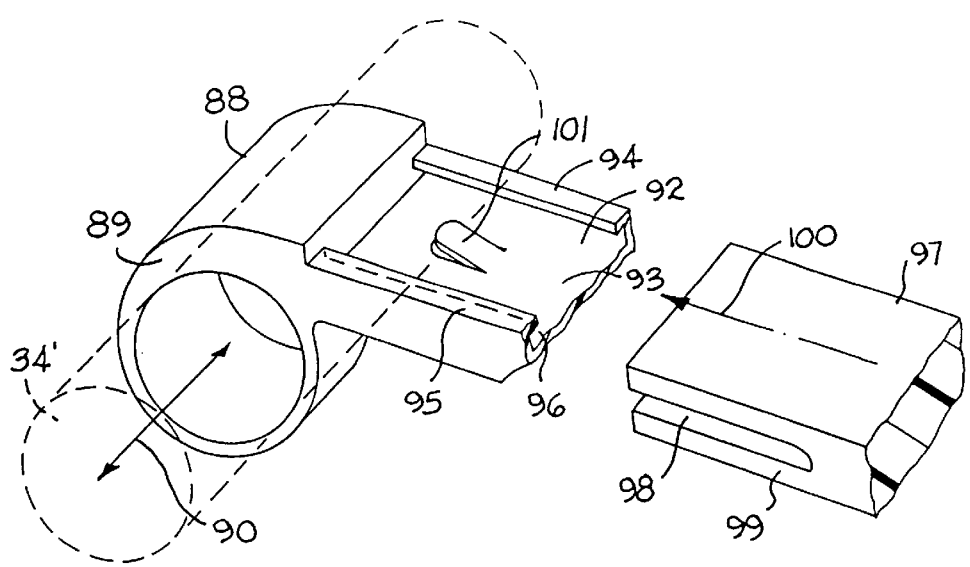
FIG. 7 is a partial exploded perspective view of another version of an attachment collar and wearstrip useful in the conveyor of FIG. 1.

Yet another version of collar is shown in FIG. 7. In this collar 88, the roller attachment portion 89 completely surrounds the roller 34'. The collar is installed on the roller by sliding over an end of the roller in the direction of two-headed arrow 90. The wearstrip attachment portion 91 features an undercut shelf 93 flanked by a pair of L-shaped lips 94, 95 that form a groove 96 with the shelf. The wearstrip 97 has slots 98 at each side of the ends of the wearstrip that accommodate the lip overhangs as the wearstrip is attached to the collar. The lower portion 99 of the wearstrip beneath the slot slides into the groove of the collar in the direction of arrow 100. A prong 101 extending obliquely upward from the shelf uses spring action to bear against the bottom of the lower portion of the wearstrip to hold it in place in the collar. In this version, no extra hardware, such as nuts and screws, is required to attach the wearstrip to the collar, and no tools are needed to remove worn wearstrip.

Figure 8:
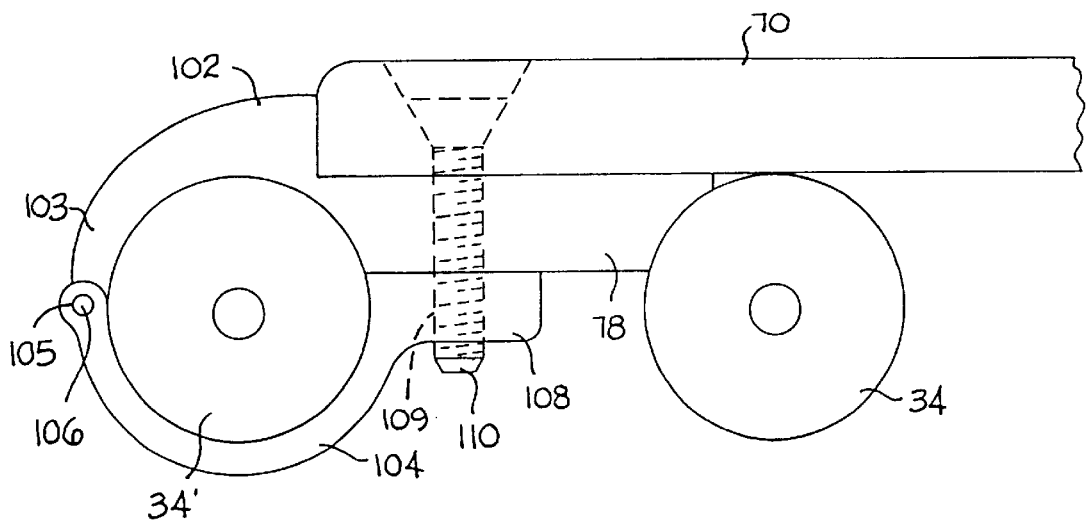
FIG. 8 is a partial side elevation view of a hinged attachment collar useful in the conveyor of FIG. 1.
Figure 9:
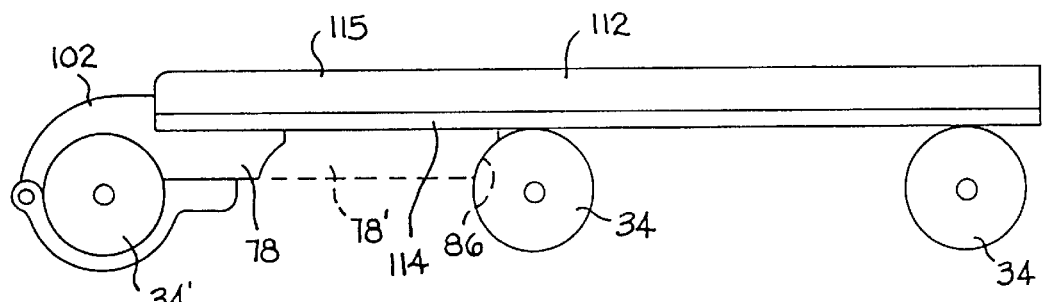
FIG. 9 is a partial side elevation view of another version of wearstrip useful in a conveyor as in FIG. 1 in which the roller spacings are large or the conveyed load is heavy.

FIG. 8 shows a hinged attachment collar 102 completely encircling a first roller 34'. The collar includes a first section 103 surrounding a portion of the roller's circumference and a second lower portion 104 surrounding the remainder of the circumference. A hinge is formed between the two sections by aligned hinge eyes 105 in each section connected by a hinge pin 106. A flange 108 extends at an end of the second section beneath the wearstrip attachment portion 78. A hole 109, preferably threaded, in the flange admits a screw 110 through the wearstrip 70 to attach the wearstrip to the collar and to fasten the collar tightly to the first roller. The collar is shown in FIG. 9 in conjunction with a metal-reinforced section of wearstrip 112. In FIG. 9, the rollers 34 are spaced apart a relatively greater distance than the rollers in FIG. 8. To provide rigidity to the wearstrip so that it can span greater spacings, a metal strip 114 underlies the plastic wearstrip material 115. In all other regards the attachment can be the same, including an extended roller attachment portion 78' (in phantom) with a contoured roller contact surface 86 to inhibit the wearstrip from bowing between consecutive rollers as a result of a belt motion along the wearstrip.

Figure 10:
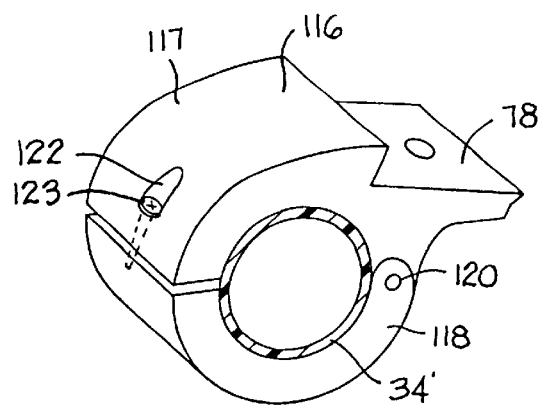
FIG. 10 is a perspective view of another version of a hinged attachment collar with screw lock useful with the conveying of FIG. 1.

Another version of a hinged collar is illustrated in FIG. 10. The collar 116 includes a first section 117 and a second section 118 surrounding complementary portions of the circumference of a roller 34'. This version differs from the collar of FIGS. 9 and 10 in that the hinge 120 is formed beneath the wearstrip attachment portion 78. A slot 122 formed in the first section opposite the hinge admits a screw or bolt 123, for example, that threads into a hole in the second section. The screw or bolt allows the collar to be attached or detached from the roller without removing the wearstrip, which is attached at the other end of the collar.

Figure 11:
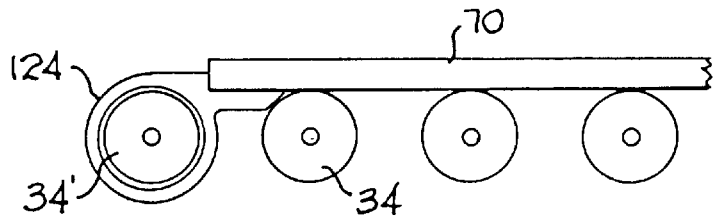
FIG. 11 is a partial side elevation view of components of a conversion kit useful with the conveyor of FIG. 1 and having a collar that slides into place along a roller.
Figure 12:
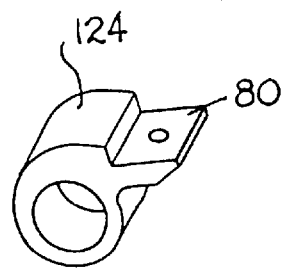
FIG. 12 is a perspective view of the collar of FIG. 11.
Figure 13:
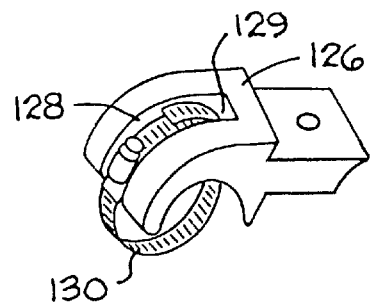
FIG. 13 is a perspective view of yet another collar useful with the conveyor of FIG. 1 in which a band is used to affix the collar to a roller.

A one-piece attachment collar that completely surrounds the roller and must be installed over an end of the roller is shown in FIGS. 11 and 12. The collar 124 contains many of the features of other versions of the collars already described. The collar 126 shown in FIG. 13 includes a curved recess 128 and an opening 129 at an end of the recess to accommodate a standard hose clamp 130 that can be tightened around a roller or loosened to allow the collar to be slipped off the end of the roller. Instead of a hose clamp, a commercially available cable tie is an even more inexpensive alternative locking band that can be used with this collar. The wearstrip attachment features are the same as those shown in FIGS. 4, 5, 10, 11, and 12.

Figure 14:
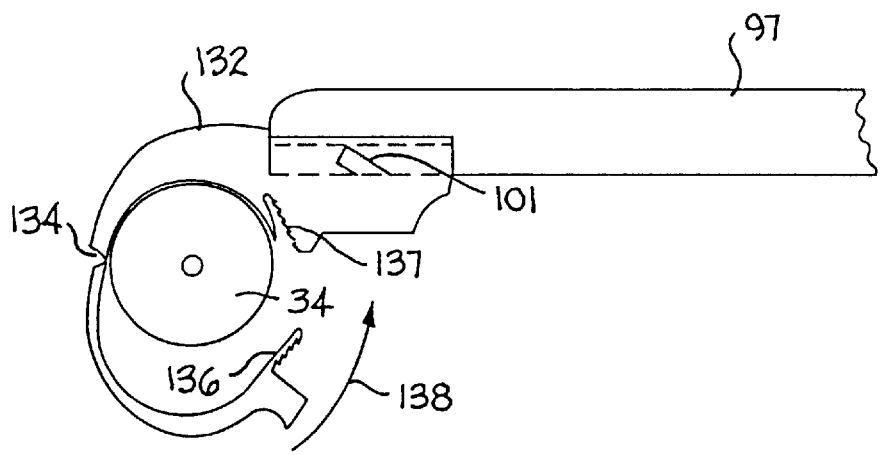
FIG. 14 is a partial side elevation view of another version of attachment collar useful with the conveyor of FIG. 1 in which the collar is a hinged cuff with a latching element.

The collar 132 in FIG. 14 includes a hinge joint 134, which can include hinge eyes and a hinge pin as in FIGS. 8–10 or can be a living hinge formed by a thinning of the collar along a line parallel to the encircled roller 34'. The collar further attaches to the roller with a barbed projection 136 from the movable section of the collar that fits in a mating receptacle 137 formed in a stationary section of the collar. The collar is locked by closing it around the roller in the direction of arrow 138. It is clear that the collar is similar to a handcuff with a latch that can be easily locked. The wearstrip attachment shown is similar to that shown in FIG. 7.

A clamping collar 140 that is especially useful with an inexpensive, commonly available wearstrip, such as VALU-GUIDE® wearstrip manufactured by Valuengineering, Inc., of Irvine, Calif., is shown in FIGS. 15–16. The wearstrip 142 is a T-shaped length of UIHMW 144 with a lower metal channel 145 crimped permanently onto the triangular base of the T. The attachment collar 140 is made of two halves 146, 147 each having a confronting notch 148, 149 that together form an upper channel shaped to fit the base of the wearstrip. Fasteners 150, such as screws or bolts, thread through clearance holes 152 formed in the collar halves. Recesses 154, 155 for a bolt head and a nut 156 keep these fastener elements from protruding beyond the outside of the collar. As the bolt is tightened into the nut, the two halves clamp the wearstrip into the channel. Thus, the channel is width-adjustable by means of the fastener and provides a clamp to tighten around or release its hold on the wearstrip. To prevent relative motion of the roller with respect to the collar, at least one of the collar halves has a threaded hole 158 for a set screw 160. The threaded hole extends from the outer surface 162 of one of the collar halves to the inner surface 163 at the roller-receiving bore of the collar. The set screw can be tightened against the encircled roller to keep it from moving relative to the collar. Clearly this set screw arrangement could be used with any of the roller versions described thus far to maintain the collars in a fixed position on a roller.

Figure 17:
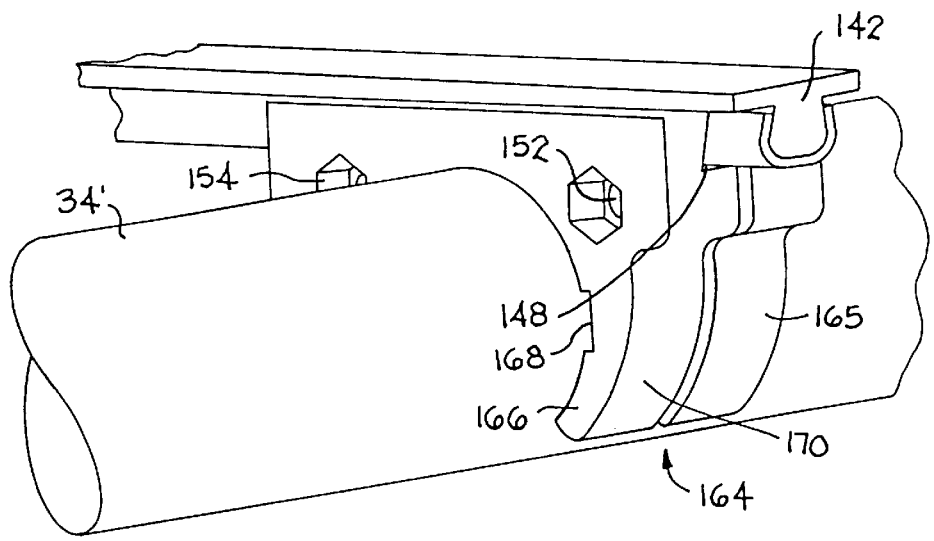
FIG. 17 is a partial perspective view of still another version of attachment roller useful with the conveyor of FIG. 1.

Another clamp-type collar is shown in FIG. 17, in which the collar 164 includes two halves 165, 166. Notches 148, like those in the two-piece collar of FIGS. 15–16, form a width-adjustable channel with sloping sides to clamp a VALUGUIDE® wearstrip 142 firmly in place. Fasteners, like those in FIGS. 15–16, inserted in clearance holes 152 with recesses 154, 155 at each end, retain the two halves together and allow the tightness of the clamp to be adjusted. Unlike the collar of FIGS. 15–16, this collar surrounds only a portion of the circumference of the roller 34'. A slot 168 in the arms 170 of the collar halves help them flex as each half is snapped onto the roller. Although the wearstrip as shown is perpendicular to the roller axis, the collar halves could alternatively be formed with their roller openings or their notches angled in such a way that wearstrip, when clamped in place, would extend at an oblique angle with respect to the roller axis.

Figure 18:
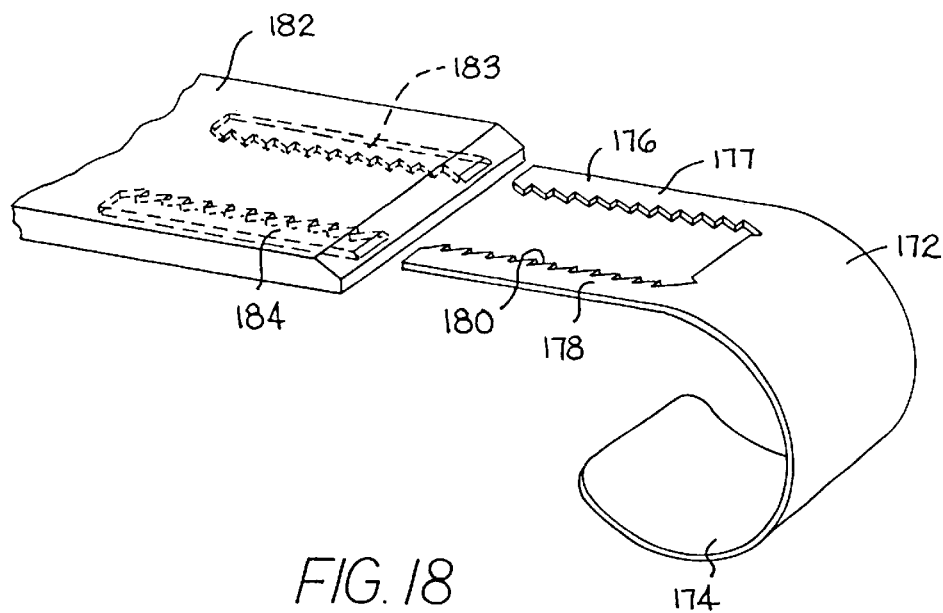
FIG. 18 is a partial perspective view of another version of components of a conversion kit useful with the conveyor of FIG. 1 in which there is a barbed attachment between the wearstrip and the collar.

Most of the collars described thus far are preferably made of a plastic material such as acetal, nylon, polypropylene, or polyethylene, although they could be metal. The clip-on collar 172 of FIG. 18 is preferably made of metal, such as spring steel or a metal with some amount of memory. The collar's roller attachment portion 174 is a spring clip that flexes open around the diameter of the roller and snaps tightly in place around the roller. The wearstrip attachment portion 176 includes two tongues 177, 178 with barbs 180. The associated wearstrip 182 has a pair of slots 183, 184 extending from one end of the wearstrip into its interior. The barbed tongues of the collar slide into the respective slots in the wearstrip. The slots are dimensioned just narrower than the maximum width of the tongues so that the barbs bite into the sides of the slots to resist separation of the wearstrip from the collar.

Figure 19:
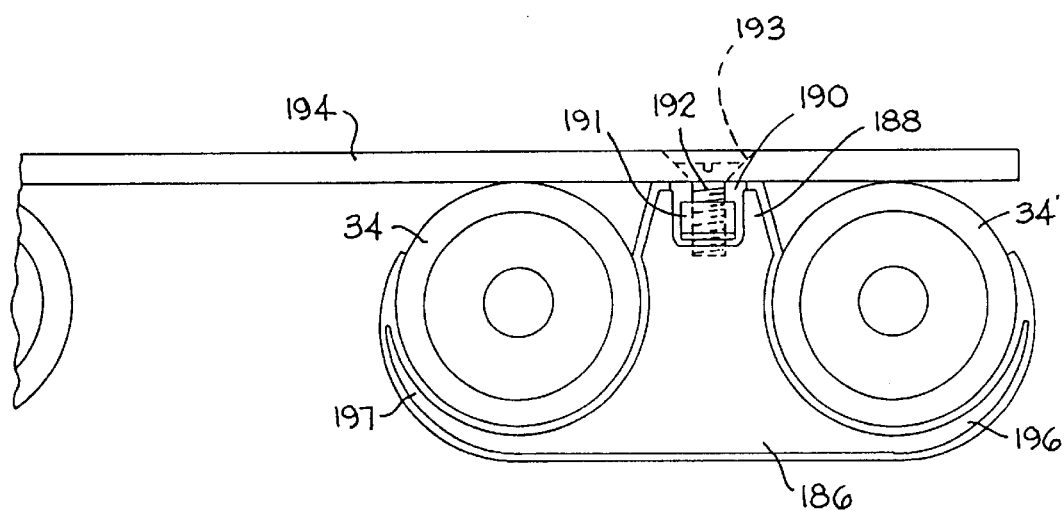
FIG. 19 is a partial side elevation view of a bifurcated attachment collar with a plate wearstrip for forming a belt conveyor bed according to the invention.
Figure 20:
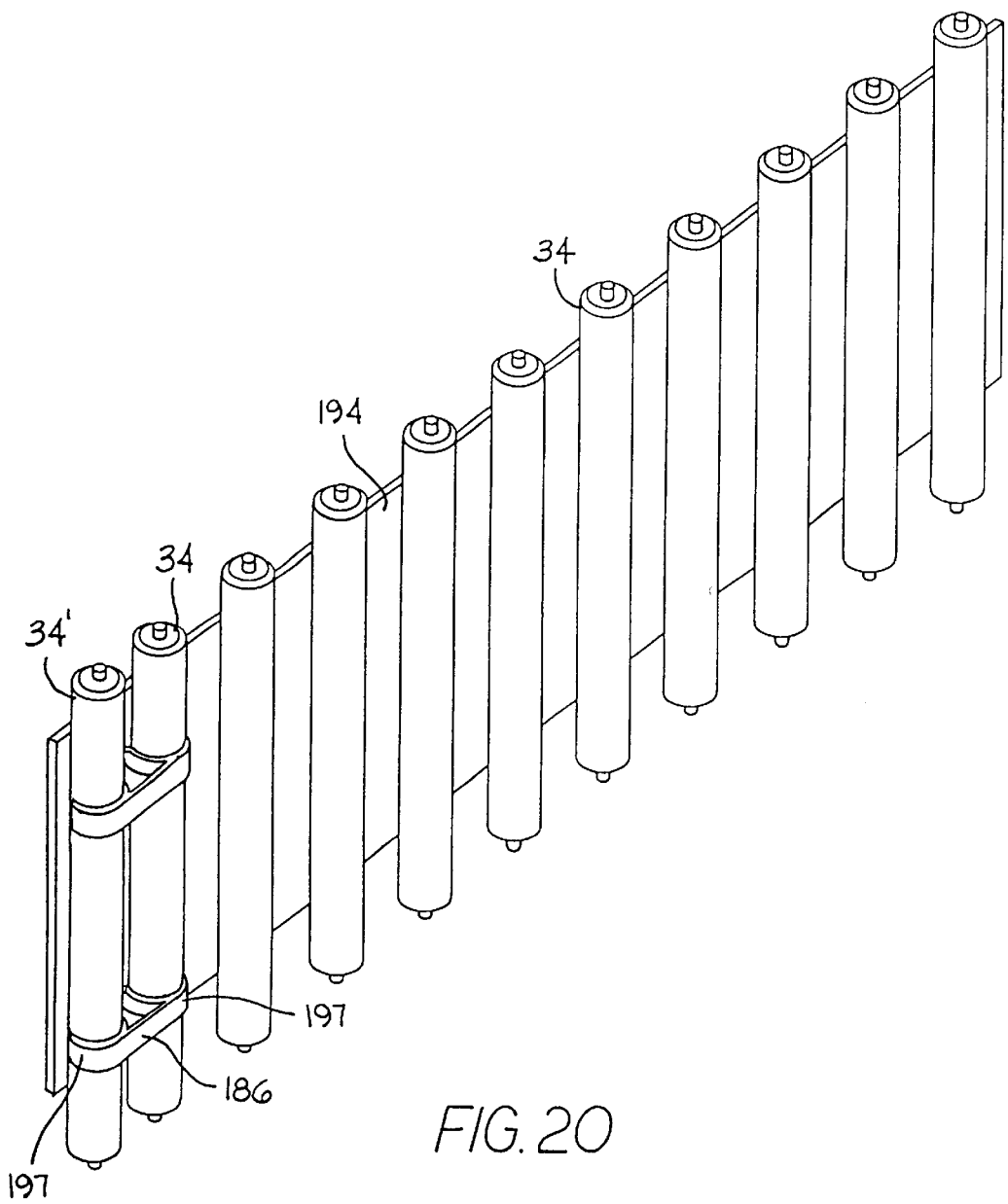
FIG. 20 is a partial bottom perspective view of a conveyor using the collar of FIG. 19.

Yet another version of collar is shown in FIGS. 19–20 with an associated wearstrip. The collar 186 includes a stem 188 disposed between two adjacent rollers 34, 34'. The stem has a recess 190 for a nut 191 that receives a screw 192 through an opening 193 in a piece of wearstrip material, such as a flat plate 194. The top of the stem is held tightly against the bottom of the wearstrip by the screw. A first arm 196 and a second arm 197 extend from the bottom of the stem, each surrounding a portion of one of the adjacent rollers. A kit comprising bifurcated attachment collars such as these and a flat plate can be used to convert a roller conveyor into a belt conveyor having a carryway bed that can be machined with openings forming various patterns to best meet the demands of support strength, cleanability, drainage, and low friction.

The attachment collars, wearstrips, and hardware make up conversion kits used to convert roller conveyors into belt conveyors without requiring rollers to be removed. The conversion is achieved simply by attaching a plurality of attachment collars from the kit to selected rollers and arranging wearstrip material that extends from the rollers in a preferred pattern overlying and spanning consecutive rollers to form a conveyor bed supported on the rollers. In some cases, it is easier to attach the wearstrip material to the collars before the collars are attached to the rollers; in other cases, it is easier to attach the collars to the rollers first. Once the conveyor carryway bed has been installed, a conveyor belt or chain is installed on the bed, completing the conversion.

Clearly, the invention provides a simple, inexpensive, and novel way of converting roller conveyors into belt conveyors, which have many advantages over roller conveyors. The many versions of attachment collars, wearstrips, and associated components used to convert roller conveyors into belt conveyors suggest that many of the features shown in one exemplary version are just as applicable in another version not explicitly showing the features. For example, the set screw used to retain the collar in place on a roller as shown in some versions applies equally to most of the other versions. Even with all the examples shown and the variety of features explicitly described, other means of latching, locking, hinging, attaching, and fastening can be used equivalently without departing materially from the teachings of the invention. Therefore, the spirit and scope of the claims are not limited to the description of the preferred versions.

What is claimed is:

1. A belt conveyor converted from a roller conveyor, the belt conveyor comprising:
    a roller conveyor including a frame having two generally parallel sides supporting a plurality of rollers therebetween at spaced apart locations along the frame; and
    a conveyor conversion kit, comprising:
        an attachment collar surrounding at least a portion of the circumference of a first roller; and
        a wearstrip extending outward from the attachment collar and overlying a group of consecutive rollers to support a conveyor belt.

2. A belt conveyor as in claim 1 wherein the attachment collar and the wearstrip are integrally formed of one piece of material.

3. A belt conveyor as in claim 1 wherein the attachment collar is C-shaped with a throat between the ends of the C forming an opening narrower than the diameter of the outer surface of the first roller.

4. A belt conveyor as in claim 1 wherein the attachment collar further surrounds at least a portion of the circumference of a second roller.

5. A belt conveyor as in claim 1 wherein the conveyor conversion kit further comprises a plurality of attachment collars disposed at spaced apart locations along the first roller with a wearstrip extending outward from each of the attachment collars.

6. A belt conveyor as in claim 1 wherein the attachment collar includes a locking band surrounding the first roller.

7. A belt conveyor as in claim 1 wherein the attachment collar comprises a hinged cuff that can be opened for installation and removal of the attachment collar and that can be closed to lock the attachment collar to the first roller.

8. A belt conveyor as in claim 1 wherein the attachment collar includes a roller attachment portion in the form of a spring clip that can be clipped on and off the first roller.

9. A belt conveyor as in claim 1 wherein the attachment collar comprises two halves including confronting notches together forming a width-adjustable upper channel to admit the wearstrip and a fastener connecting the two halves and adjusting the width of the upper channel to clamp or unclamp the wearstrip.

10. A belt conveyor as in claim 1 wherein the wearstrip is in a zig-zag pattern forming one or more vertices and wherein at least one of the vertices of the wearstrip extends from the attachment collar.

11. A belt conveyor as in claim 1 wherein the conveyor conversion kit comprises a plurality of attachment collars, each of the attachment collars surrounding at least a portion of the circumference of a roller, and wherein the wearstrip comprises a flat plate attached to a set of the plurality of attachment collars to provide a substantially continuous conveyor bed overlying a group of consecutive rollers.

12. A belt conveyor as in claim 1 wherein the attachment collar comprises a stem disposed between the first roller and a second adjacent roller, a first arm extending from the stem to surround at least a portion of the first roller, and a second arm oppositely extending from the stem to surround at least a portion of the second adjacent roller.

13. A belt conveyor as in claim 1 wherein the wearstrip extends from the attachment collar at an oblique angle relative to the axis of the first roller.

14. A belt conveyor as in claim 1 wherein the attachment collar includes a roller attachment portion surrounding at least a portion of the first roller and a wearstrip attachment portion extending from the roller attachment portion, the wearstrip attachment portion forming a roller contact surface contoured to rest on a second consecutive roller to inhibit the wearstrip from bowing between the rollers.

15. A belt conveyor as in claim 1 wherein the attachment collar includes a roller attachment portion comprising an inner surface contoured to match the circumference of the first roller.

16. A belt conveyor as in claim 15 wherein the roller attachment portion includes an outer surface and forms a threaded hole extending from the outer surface to the inner surface and wherein the conveyor conversion kit further includes a set screw disposed in the threaded hole that can be tightened to bear against the first roller to prevent relative motion between the first roller and the attachment collar.

17. A belt conveyor as in claim 1 wherein the attachment collar surrounds the entire circumference of the first roller.

18. A belt conveyor as in claim 12 wherein the attachment collar forms a central bore contoured to match the circumference of the first roller and wherein the attachment collar is installed on the first roller by sliding over an end of the first roller.

19. A belt conveyor as in claim 2 wherein the attachment collar comprises a first section surrounding a first portion of the circumference of the first roller and a second section surrounding a second portion of the circumference.

20. A belt conveyor as in claim 4 wherein the attachment collar comprises a hinge between the first section and the second section.

21. A belt conveyor as in claim 19 wherein the first and second sections are separable from each other.

22. A belt conveyor as in claim 19 wherein the attachment collar comprises a latch between the first and second sections.

23. A conversion kit for converting a roller conveyor into a belt conveyor, the kit comprising:
a plurality of attachment collars for attaching to rollers of a roller conveyor; and
wearstrip material to extend outward from the attachment collars and to overlie a group of consecutive rollers of the roller conveyor to support a conveyor belt.

24. A conversion kit as in claim 23 wherein at least one of the attachment collars is formed to surround the entire circumference of a roller.

25. A conversion kit as in claim 23 wherein at least one of the attachment collars is integrally formed with a portion of the wearstrip material.

26. A conversion kit as in claim 23 wherein at least one of the attachment collars is C-shaped with a throat between the ends of the C forming an opening narrower than the diameter of the outer surface of the rollers.

27. A conversion kit as in claim 23 wherein at least one of the attachment collars includes a locking band surrounding a roller.

28. A conversion kit as in claim 23 wherein at least one of the attachment collars comprises a hinged cuff that can be opened for installation and removal of the attachment collar and that can be closed to lock the attachment collar to a roller.

29. A conversion kit as in claim 23 wherein at least one of the attachment collars includes a roller attachment portion in the form of a spring clip that can be clipped on and off a roller.

30. A conversion kit as in claim 23 wherein at least one of the attachment collars comprises two halves including confronting notches together forming a width-adjustable upper channel to admit a portion of the wearstrip material and a fastener connecting the two halves and adjusting the width of the upper channel for clamping and unclamping the portion of wearstrip material.

31. A conversion kit as in claim 23 wherein the wearstrip material is formed in a zig-zag pattern forming one or more vertices.

32. A conversion kit as in claim 23 wherein the wearstrip material is formed as at least one flat plate attachable to a set of the plurality of attachment collars.

33. A conversion kit as in claim 23 wherein at least one of the attachment collars comprises a stem having a first end and a second end, a first arm extending from the second end of the stem, a second arm oppositely extending from the second end of the stem, and wearstrip attachment means at the first to attach to the wearstrip material.

34. A conversion kit as in claim 23 wherein the wearstrip material extends from the attachment collars at an oblique angle relative to the axes of the rollers.

35. A conversion kit as in claim 23 wherein at least one of the attachment collars includes a roller attachment portion surrounding at least a portion of a first roller and a wearstrip attachment portion extending from the roller attachment portion, the wearstrip attachment portion forming a roller contact surface contoured to rest on a second consecutive roller to inhibit the wearstrip from bowing between the rollers.

36. A conversion kit as in claim 23 further comprising a conveyor belt supportable on the wearstrip material.

37. A conversion kit as in claim 23 wherein at least one of the attachment collars includes a roller attachment portion comprising an inner surface contoured to match the circumference of the rollers.

38. A conversion kit as in claim 37 wherein the roller attachment portion includes an outer surface and forms a threaded hole extending from the outer surface to the inner surface and wherein the conveyor conversion kit further includes a plurality of set screws, each set screw disposed in the threaded hole to be tightened to bear against a roller to prevent relative motion between the roller and the attachment collar.

39. A conversion kit as in claim 23 wherein at least one of the attachment collars comprises a first section formed to surround a first portion of the circumference of a roller and a second section to surround a second portion of the circumference.

40. A conversion kit as in claim 39 wherein at least one of the attachment collars comprises a hinge between the first section and the second section.

41. A conversion kit as in claim 39 wherein the first and second sections are separable from each other.

42. A conversion kit as in claim 39 wherein at least one of the attachment collars comprises a latch between the first and second sections.

43. A method for converting a roller conveyor into a belt conveyor, the method comprising:
attaching a plurality of attachment collars to selected rollers of a roller conveyor;
arranging wearstrip material extending from the attachment collars in a pattern overlying and spanning consecutive rollers to form a conveyor bed of wearstrip material supported on the rollers; and installing a conveyor belt on the conveyor bed.

44. A conversion kit for converting a roller conveyor into a belt conveyor, the kit comprising a plurality of attachment collars adapted to be attached to rollers of a roller conveyor, wherein the attachment collars include an attachment portion at which wearstrip material can be attached to the attachment collars.

* * * * *